US007697935B2

(12) United States Patent
Guyot et al.

(10) Patent No.: US 7,697,935 B2
(45) Date of Patent: Apr. 13, 2010

(54) TRANSFER OF A USER EQUIPMENT IN A COMMUNICATION SYSTEM

(75) Inventors: Olivier Guyot, Helsinki (FI); Tony Hulkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 140 days.

(21) Appl. No.: 11/211,508

(22) Filed: Aug. 26, 2005

(65) Prior Publication Data

US 2006/0073831 A1    Apr. 6, 2006

(30) Foreign Application Priority Data

Oct. 6, 2004    (GB)    ................................. 0422192.5

(51) Int. Cl.
*H04W 36/00*    (2006.01)
(52) U.S. Cl. ........................ 455/443; 455/436; 455/439; 455/442; 455/451; 370/395.41; 370/230; 370/231; 370/236; 370/278; 370/282; 370/329; 370/360; 370/395.2; 379/15.01; 379/91.02
(58) Field of Classification Search ................ 455/443, 455/436, 439, 442, 445, 451, 452; 370/395.41, 370/230, 231, 235, 278, 282, 329, 360, 395.2; 379/15.01, 91.02
See application file for complete search history.

(56) References Cited

U.S. PATENT DOCUMENTS

| 5,903,832 | A | * | 5/1999 | Seppanen et al. | ......... | 455/435.3 |
|---|---|---|---|---|---|---|
| 5,911,122 | A | * | 6/1999 | Corriveau et al. | ......... | 455/432.3 |
| 5,978,679 | A | * | 11/1999 | Agre | .......................... | 455/442 |
| 6,285,880 | B1 | * | 9/2001 | Gagnon et al. | ........... | 455/432.1 |
| 7,110,788 | B2 | * | 9/2006 | Park et al. | ................ | 455/552.1 |
| 7,236,784 | B2 | * | 6/2007 | Johannesson et al. | .... | 455/435.2 |
| 2001/0007819 | A1 | * | 7/2001 | Kubota | ....................... | 455/439 |
| 2002/0132636 | A1 | * | 9/2002 | Stockhusen | .................. | 455/553 |
| 2003/0013443 | A1 | * | 1/2003 | Willars et al. | ............... | 455/432 |
| 2003/0157927 | A1 | * | 8/2003 | Yi et al. | ...................... | 455/411 |
| 2003/0207688 | A1 | * | 11/2003 | Nikkelen | .................... | 455/439 |

(Continued)

FOREIGN PATENT DOCUMENTS

DE    10334872    3/2005

(Continued)

OTHER PUBLICATIONS

3GPP-ETSI—TS 125 331 V6.2.0 (XP-014016835), "Universal Mobile Telecommunications System UMTS); Radio Resource Control (RRC) protocol specification", Jun. 2004, pp. 1-1037.

(Continued)

*Primary Examiner*—Rafael Pérez-Gutiérrez
*Assistant Examiner*—Nimesh Patel
(74) *Attorney, Agent, or Firm*—Squire, Sanders & Dempsey, LLP

(57) ABSTRACT

The disclosure relates to transfer of a user equipment from a network to another network. In the method a user equipment communicating with a first network is transferred from the first network to a second network providing resources to a plurality of operators. After initiation of the transfer, an operator is selected for the user equipment amongst the plurality of operators. A controller of the second network is then provided with information regarding the identity of the selected operator, and the user equipment is transferred to the second network. Information regarding the identity of the selected operator is also sent to the user equipment.

23 Claims, 5 Drawing Sheets

U.S. PATENT DOCUMENTS

| | | | |
|---|---|---|---|
| 2004/0017798 A1* | 1/2004 | Hurtta et al. | 370/352 |
| 2004/0066756 A1* | 4/2004 | Ahmavaara et al. | 370/328 |
| 2004/0162077 A1* | 8/2004 | Kauranen et al. | 455/445 |
| 2004/0258019 A1* | 12/2004 | Haumont et al. | 370/331 |
| 2005/0073977 A1* | 4/2005 | Vanghi et al. | 370/335 |
| 2005/0107083 A1* | 5/2005 | Rager et al. | 455/435.1 |
| 2005/0221824 A1* | 10/2005 | Lee et al. | 455/435.2 |
| 2005/0254469 A1* | 11/2005 | Verma et al. | 370/338 |
| 2007/0161373 A1* | 7/2007 | Klatt | 455/434 |
| 2008/0098467 A1* | 4/2008 | Miller et al. | 726/5 |

OTHER PUBLICATIONS

3GPP TS 23.251 V6.1.0 (Sep. 2004), "Network Sharing; Architecture and Functional Description", Sep. 2009, pp. 1-15.

Chinese Office Action dated November 6, 2009.

* cited by examiner

TRANSFER OF A USER EQUIPMENT IN A COMMUNICATION SYSTEM

BACKGROUND OF THE INVENTION

1. Field of the Invention

The present disclosure relates to a communication system, and in particular, but not exclusively, to transferring a user equipment from a network to another network in a communication system, said other network providing sharable network resources.

2. Description of the Related Art

A communication system can be seen as a facility that enables communication sessions between two or more entities such as user equipment and/or other nodes associated with the communication system. The communication may comprise, for example, communication of voice, data, multimedia and so on. A user equipment connected to a communication system may, for example, be provided with a two-way telephone call or multi-way conference call or with a data connection. A user equipment may communicate packet data to and from a server entity, or between two or more user equipments.

A communication system typically operates in accordance with a given standard or specification which sets out what the various entities associated with the system are permitted to do and how that should be achieved. For example, the standard or specification may define if a user equipment is provided with a circuit switched service or a packet switched service or both. Communication protocols and/or parameters which shall be used for the connection are also typically defined. For example, the manner how the user equipment can access the communication system and how communication shall be implemented between the user equipment and the elements of the communication network is typically based on predefined communication protocols. In other words, a specific set of "rules" on which the communication can be based on needs to be defined to enable the user equipment to communicate via the communication system.

Communication systems proving wireless communication for user equipment are known. These systems are commonly referred to as mobile systems, although in certain systems the mobility may be restricted to substantially small areas. An example of the mobile systems is the public land mobile network (PLMN). A PLMN is commonly based on cellular architecture. Another example is a mobile system that is based, at least partially, on use of communication satellites. Mobile communications may also be provided by means of other mobile systems, such as by means of wireless local area networks (WLAN).

In a common wireless system a base station servers a plurality of user equipment. A user equipment may also be in wireless communication with two or more base stations at the same time. Communication on the wireless interface between the user equipment and the base station can be based on an appropriate communication protocol. A base station is understood to be a part of an access network (AN) that enables the mobile station to access the core part of the communication network, referred to as the core network (CN).

The skilled person knows the basic operational principles and elements required for the wireless access. Examples of these include access systems such as the CDMA (Code Division Multiple Access), WCDMA (Wide-band CDMA), TDMA (Time Division Multiple Access), FDMA (Frequency Division Multiple Access), or SDMA (Space Division Multiple Access) and hybrids thereof.

Each base station and/or access network is controlled by an appropriate control arrangement. The operation of a base station and other apparatus of the access network can be controlled by one or several control entities. Two or more base stations may be controlled by a controller. For example, the third generation (3G) Wideband Code Division Multiple Access (WCDMA) networks employ control entities known as radio network controllers (RNC) for controlling the operation of the wireless access network. In the second generation (2G) GSM (Global System for mobile) the access network is understood to be controlled by a base station controller (BSC). A radio network controller may control a number of stations, or all stations, of an access network.

The access network controllers are connected to appropriate core network entities. One or more gateway nodes may also be provided for connecting a core network to other networks. For example, a mobile core network may be connected to other mobile or fixed line communication networks or communication networks such as an IP (Internet Protocol) and/or other packet data networks.

A communication network is commonly run and operated by a network operator. The operation environment of network operators has changed and is becoming more dynamic in its nature. For example, partnerships, acquisitions, creative agreements among operators and so on have forced the operators to rethink the way they use the resources of their networks. The changes have opened the minds for the possibility of sharing the networks resources. However, there are some technical obstacles before more dynamic operation and sharing of the resources could become reality, not least because of the way the technical aspects of the networks are standardised.

The concept of "network sharing" shall be understood broadly, and includes various scenarios, for example, but not limiting to these, a common radio access network connected to a multiple core networks, multiple radio access networks sharing one core network, or multiple radio access networks connected to a multiple of core networks.

Conventionally telecommunications service providers have operated and owned their networks. Use of a network by a party other that the owner of the network has been enabled by means of roaming agreements or the like. For example, when the GSM and then the UMTS systems were specified, the possibility of sharing part or the entire network by two or more separate commercial entities was not considered at all. GSM was designed under the principle "one operator, one radio access network". Although the GSM network has some possibilities of infrastructure sharing, it does not properly support sharing of resources at the radio access network level. The initial design of third Generation Partnership Project (3GPP) systems has followed the same principle. As a result the standards lack functionalities that could enable the realization of such commercial agreements, and more efficient use of the resources.

Proposals for network-sharing include the scenarios such as the Gateway Core Network (GWCN) and the Multiple Operator Core Network (MOCN). The GWCN scenario is intended for legacy-shared networks, and defines how a gateway core network can be deployed for shared-network architecture where, besides the radio access network, mobile switching centres (MSCs) and serving GPRS (general packet radio service) support nodes (SGSNs) are also shared. The GWCN scenario also describes how the scenario might be deployed with functionalities of older networks. It also allows the radio access network operator to be or not to be one of the core network operators.

One recent improvement for the GWCN scenario is the possibility to select a network by a user equipment. In this scenario the user equipments can be made aware of the operators providing services in the shared network. A supporting user equipment for use in this scenario may be any equipment which is capable of understanding information about available operators as provided by the shared network, selecting one of the available operators, and indicating the selected operator to the network.

User equipments that are supporting shared networks are a fairly recent proposal. Therefore a number of non-supporting user equipment will be in use for the foreseeable future. When a user equipment that is not supporting network sharing is being transferred from an access network to another, the target shared access network controller should include a commonly used operator identity that is understood by such a user equipment. In certain systems, for example those based on 3G standards, radio access network provides a globally unique location information to a user equipment when it is transferred from an access network to another. Thus, the location information contains a PLMN identity as part of the location information. In a communication system employing sharing of network resources a question is which PLMN identity is provided to the user equipment, since there are a multiple of choices, due to a multiple of operators providing service in the same physical network. It has been proposed that for a non-supporting user equipment, the PLMN identity should be the identity of the radio access network (Common-PLMN-ID), and not the identity of any of the possible operators.

However, the access network controller does not necessarily know if a user equipment is configured such that it can support sharing of network resources. Thus the controller may not know to which user equipments it should include information regarding the identity of the possible serving network.

In addition to this, when handing over or relocating a user equipment from a non-shared network to a shared network with GWCN configuration, the target shared access network controller may not necessarily know which one of the PLMNs of the network should be serving the user equipment.

It shall be appreciate that the problem is not limited to transfer from a non-shared to shared network. Similar problem may occur within a shared network.

A user equipment may be transferred from an access system to another, for example in handover or relocation. It is technically possible that a user equipment that supports network sharing registers to a different core network operator for packet switched domain than the one serving the user equipment for an ongoing circuit switched connection. This may not always be desirable.

A user equipment is RRC-connected after a handover, and thus it may not have to include a core network identity in a message such as the 'INTIAL DIRECT TRANSFER' message to access network controller, because the access network should already know what is the identity of the selected PLMN. However, the access network controller needs to know in that case the selected PLMN for the user equipment, because it may need to indicate it to the user equipment and also because it may need to store it so that the access network controller is able to indicate the identity to the shared SGSN in the case of GWCN, when NAS-RAU has to be sent via RANAP:INTIAL UE MESSAGE (after reception from user equipment of the RRC:INTIAL DIRECT TRANSFER message, which does not include the identity because the user equipment is RRC-connected). Furthermore, after circuit switched handover from non shared network or another shared access controller, the access network controller is mandated, in order to allow the user equipment to register on a packet switched domain, to send the RRC:UTRAN MOBILITY INFORMATION to the user equipment, which includes the core network Information Info that indicates the current Selected PLMN to the user equipment. The supporting user equipment may need to get the right PLMN identity because it may need to use it later on when the circuit switched call is released and the user equipment goes back to idle. In that case the user equipment may perform background scan and check whether its current selected PLMN is the right high priority PLMN. If not the user equipment may perform another routing area update (RAU). If the access network controller sends to user equipment a Common PLMN-ID instead of a selected CN-PLMN-ID in the core network information info in UTRAN MOBILITY INFORMATION, the user equipment will almost always performs a RAU after the circuit switched call is released, leading to significant increase in signaling.

Therefore there is a need for an improved solution for the handling of handovers or other relocations of user equipment in communications systems including at least one shared network.

SUMMARY OF THE INVENTION

Embodiments of the present invention aim to address one or several of the above problems.

According to one embodiment, there is provided a method for transferring a user equipment from a network to a second network. The method comprises initiating transfer of a user equipment communicating with a first network from the first network to the second network, the second network providing resources to a plurality of operators, selecting an operator for the user equipment from the plurality of operators, providing the second network with information regarding identity of the selected operator, transferring the user equipment to the second network, and sending information regarding the identity of the selected operator to the user equipment.

According to another embodiment, there is provided a core network controller for a communication system configured to provide resources to a plurality of operators. The controller comprises a processor for selecting an operator amongst a plurality of operators for a user equipment that is to be transferred from a first network to a second network, and an interface for sending information regarding the identity of the selected operator to a further controller for sending to the user equipment.

According to another embodiment, there is provided an access network controller for a communication system configured to that provide resources to a plurality of operators. The controller comprises at least one interface for receiving information regarding the identity of a operator to be used by a user equipment from a further controller and for sending said information to the user equipment, and a processor for determining if a user equipment is provided with shared network capability and for controlling identity information to be transmitted to a user equipment.

According to another embodiment, there is provided a user equipment for communication with a network providing resources to a plurality of operators. The user equipment comprises a radio part for wireless communication with communication networks, and at least one controller for processing transfer of the user equipment from communication with a first network to communication with a second network. The at least one controller is configured to process information regarding the identity of an operator selected from the plurality of operators, the information being received via the radio part and after initiation of a transfer to the second network.

According to yet another embodiment, there is provided a communication system comprising a plurality of communication networks, at least one of the communication networks providing resources to a plurality of operators, and a controller for selecting an operator for the user equipment amongst a plurality of operators and for sending to a further controller information regarding the identity of the selected operator. The further controller is configured to determine if a user equipment supports resource sharing, and subsequent to determination that the user equipment supports sharing of network resources, to send information regarding the identity of the selected operator to the user equipment.

The embodiments of the invention may provide advantage in that the resources of shared networks may be more efficiently used. An user equipment may be prevented from performing a packet switched (PS) registration to a wrong network when moving to a shared network while having ongoing circuit switched (CS) call and from performing subsequent registration to higher priority network which would increase the signalling load in the network. Consistent mobility handling may be enabled for network sharing that supports user equipments.

BRIEF DESCRIPTION OF DRAWINGS

For better understanding of the present invention, reference will now be made by way of example to the accompanying drawings in which.

DETAILED DESCRIPTION OF THE PREFERRED EMBODIMENTS

It is noted that even though the exemplifying communication system shown and described in more detail in this disclosure uses the terminology of the $2^{nd}$ generation and $3^{rd}$ generation (3G) WCDMA (Wideband Code Division Multiple Access) networks, such as the GSM, UMTS (Universal Mobile Telecommunications System) or CDMA2000 public land mobile networks (PLMN), embodiments of the proposed solution can be used in any wireless communication system wherein similar problems in relocation of user equipment may be solved by means of the embodiments of the invention.

In a mobile communication network such as a public landline mobile network (PLMN) a number of base stations is arranged to wirelessly transmit signals to and receive signals from a plurality of mobile user equipment 1. The base station are not shown in FIG. 1 for clarity reasons. Likewise, each of the mobile user equipment 1 is able to transmit wireless signals to and receive signals from appropriate base station. Typically a mobile user equipment is able to move within the access network provided by one or more base stations and also from one access network coverage area to another coverage area. The location of a mobile station may thus vary in time as the mobile user equipment may be free to move within the mobile communication system. A mobile communication system may be provided by a plurality of mobile communication networks. An appropriate user equipment is provided with required radio transmission elements and controller functions so that it is enabled to send and receive data from the network, and process control instructions it may receive from the network and to send required control information to the network.

Figure 1:
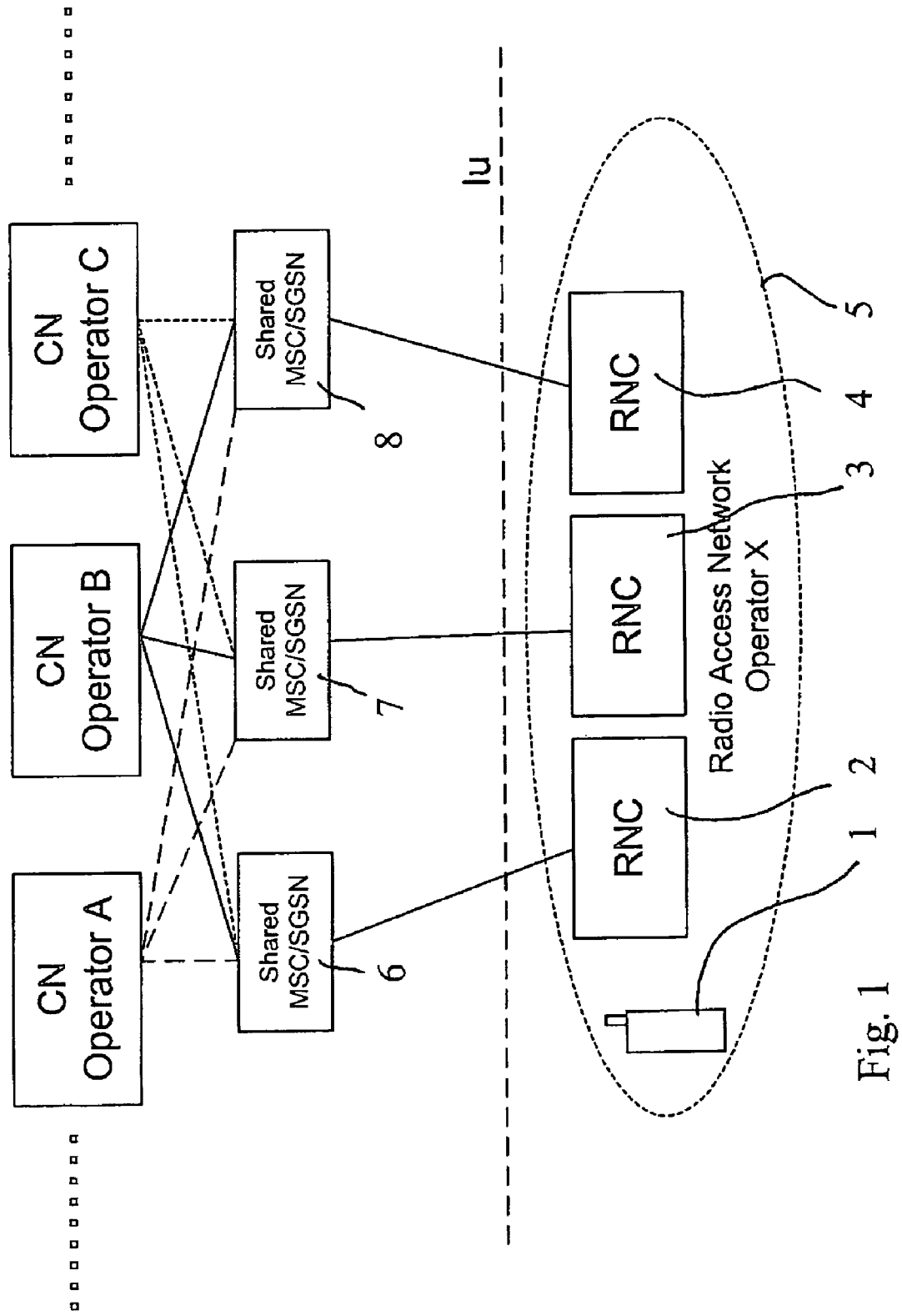
FIG. 1 shows a communication system wherein the present invention may be embodied.

FIG. 1 shows also an access network 5 provided with three access network controllers, and more particularly three radio network controllers (RNC) 2, 3 and 4. Each of the base stations is commonly connected to an access network controller. The access network controllers commonly provide control on the elements of the access network, such the base stations. The access network controllers are commonly connected to other network elements, such as to an appropriate core network (CN) controller entities via suitable interconnections. The core network controller entities may comprise, for example mobile switching centers (MSC) and/or serving GPRS (general packet radio service) support nodes (SGSNs) 6, 7, and 8, gateway nodes (not shown in FIG. 1) and so on.

Figure 2:
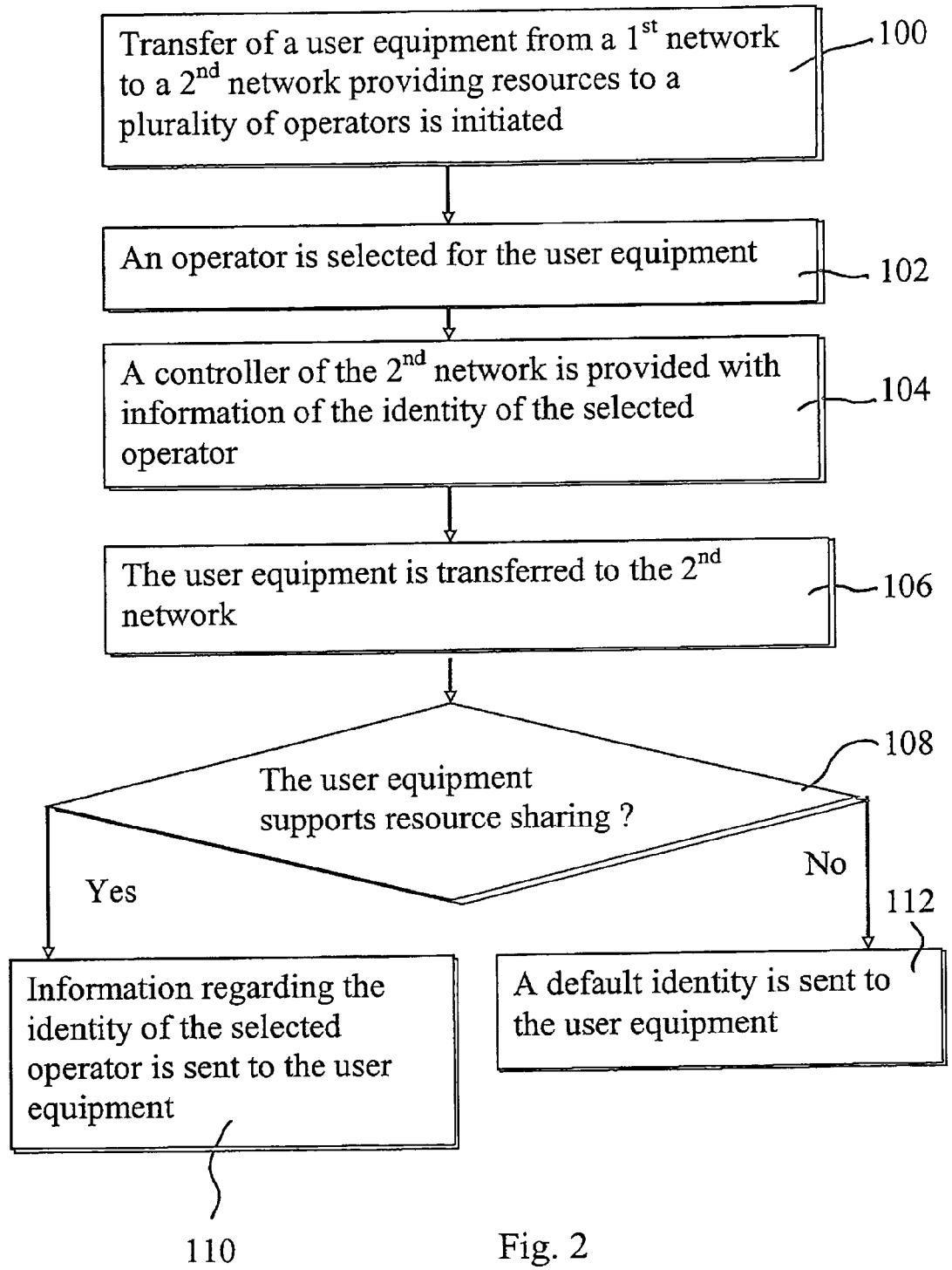
FIG. 2 is a flowchart illustrating an embodiment of the present invention.

A reference is now also made to the flowchart of FIG. 2. A user equipment may be transferred from a network to another for example by means of procedures such as handover or relocation. The transfer is initiated in step 100 in response to a predetermined event triggering the transfer. The transfer may be performed from a first type of an access system to another type of an access system. For example, an Inter-RAT (Radio Access Technology) handover from GSM to UTRAN (UMTS Terrestrial Radio Access Network) may be performed.

A core network controller of the new network is informed of the user equipment. If the new core network is a shared network, the core network controller may select an appropriate operator at step 102. An access network associated with the new core network may then be informed of the selection at step 104.

The user equipment is then transferred to the new network. At this stage the access network controller may send to the user equipment an appropriate information message, for example a 'UTRAN MOBILITY INFORMATION' message. This information message may be sent as one of the first resource control messages after the access network controller has received a confirmation that the handover is completed, for example a 'HANDOVER TO UTRAN COMPLETE' message, from the user equipment. The information message is for informing the user equipment about its location including the identity of the PLMN with which the user equipment has a signaling connection. The 'UTRAN MOBILITY INFORMATION' message commonly contains only one PLMN identity.

The target access network controller, such as one of the RNCs of FIG. 1, may indicate in the 'UTRAN MOBILITY INFORMATION' message the identity of the core network operator towards which a user equipment that is configured to support network sharing already has a signaling connection. In a shared network case, this may be needed in order to guide the subsequent messages, such as routing area updates (RAU) to the correct PLMN for a user equipment that supports network sharing.

The embodiments provide a mechanism for the network to determine the appropriate identity of which a user equipment should be informed. Such selection may be needed, for example, in the GWCN case referred to above, although it shall be appreciated this may not always be necessary. The necessity may arise for example in applications where several core network operators share MSC/SGSN resources, or the operators do not have any dedicated connections towards the shared target access networks controller. Therefore the access network controller may need to be informed about the identity of the selected operator. This can be provided, for example, in a 'RELOCATION REQUEST' message from the shared MSC.

However, the shared core network element, for example a MSC, may not always know whether the user equipment is a supporting user equipment or not. The network element may nevertheless send a CN-PLMN-ID to the target shared access network controller in a 'RELOCATION REQUEST' message. It is then up to the access network controller to decide at step 108 if the user equipment needs to be informed of the identity or not.

The identity of the selected operator is sent to a supporting user equipment in step 110. If it is detected at the access network that the user equipment does not support network resource sharing, the access network controller may send a common-PLMN-ID instead, see step 112, i.e. PLMN-ID of the shared radio access network. This is an example of identities a non-supporting user equipment can still detect and understand.

The access network controller may be configured such that is can determine whether the user equipment supports network sharing or not. This information can be derived, for example, in the 3G systems from an Access Stratum (AS) release indication included in a 'RRC CONNECTION REQUEST' message and/or in a 'INTER RAT HANDOVER INFO' message. The 'INTER RAT HANDOVER INFO' is an example of messages a user equipment may send to a network before a handover takes place. This message is then delivered by the network to the target the access network controller. The 'INTER RAT HANDOVER INFO' contains an information element specifying compliancy of the user equipment with the access stratum specifications of a particular 3GPP release. So in case of 2G to 3G handover, the target access network controller may obtain from this knowledge if a user equipment is a "non-supporting user equipment" or a "supporting user equipment". In case of 3G to 3G handover, the source access network controller may get information about the user equipment's capabilities from the 'RRC CONNECTION REQUEST' message. The received capability information is sent by the source access network controller to target access network controller in handover signaling.

The following exemplifying scenarios relate to an Inter-RAT handover from a 2G non-shared network to a 3G shared network, an Intra-UMTS relocation/handover from a non-shared 3G network to a shared 3G network, and a relocation/handover from a shared 3G network to another shared 3G network.

In the below described examples operator identity information is transferred by extending the 'RELOCATION REQUEST' message with one additional information element (IE). The information element may be used for carrying a core network identity, such as the CN-PLMN-ID when handing a user equipment over or relocating a user equipment from a non-shared network to a shared UMTS network with GWCN configuration.

Figure 3:
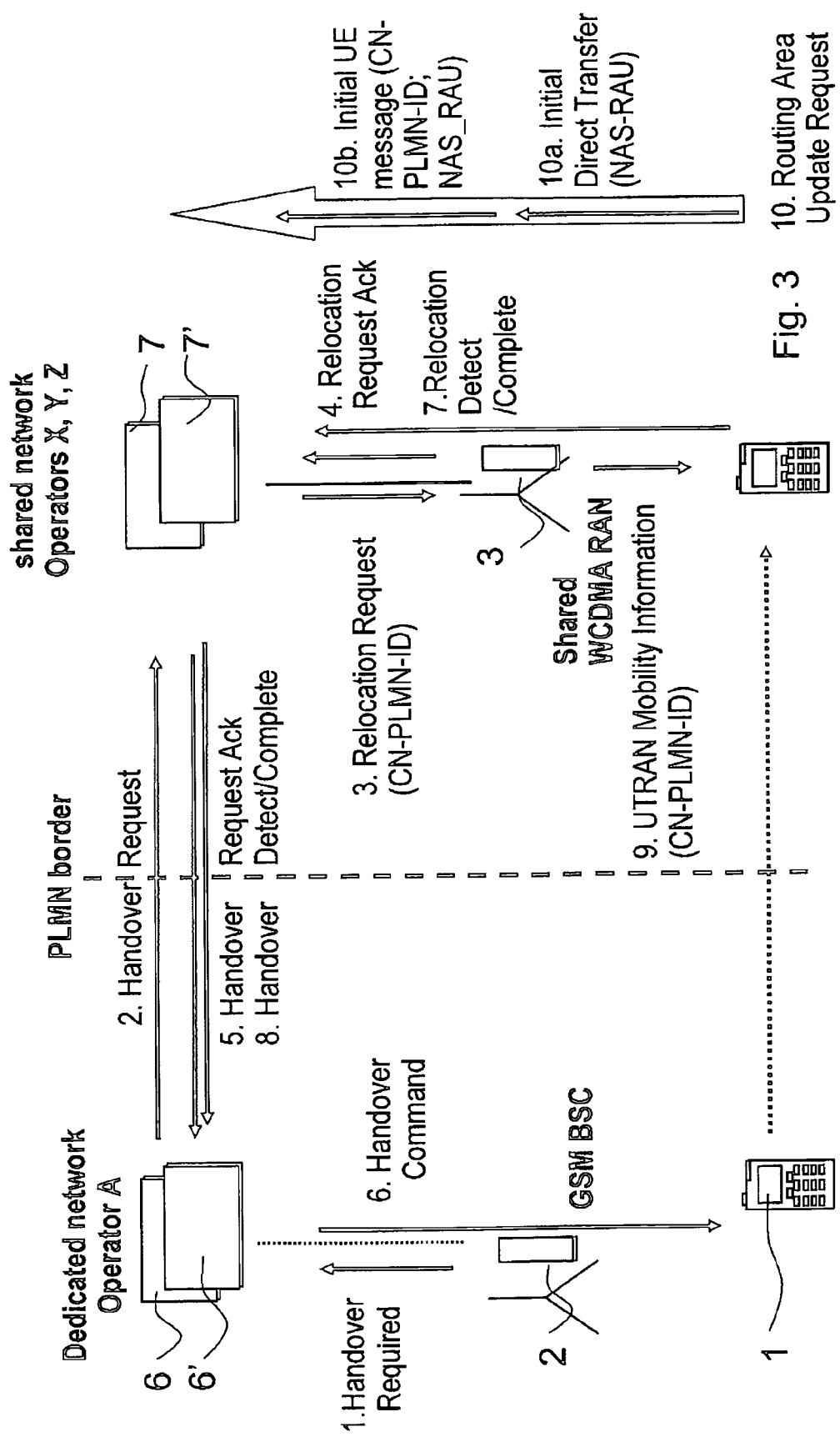
FIG. 3 shows a scenario of handover from a 2G non-shared network to a 3G shared network, and the corresponding signaling flows.
Figure 4:
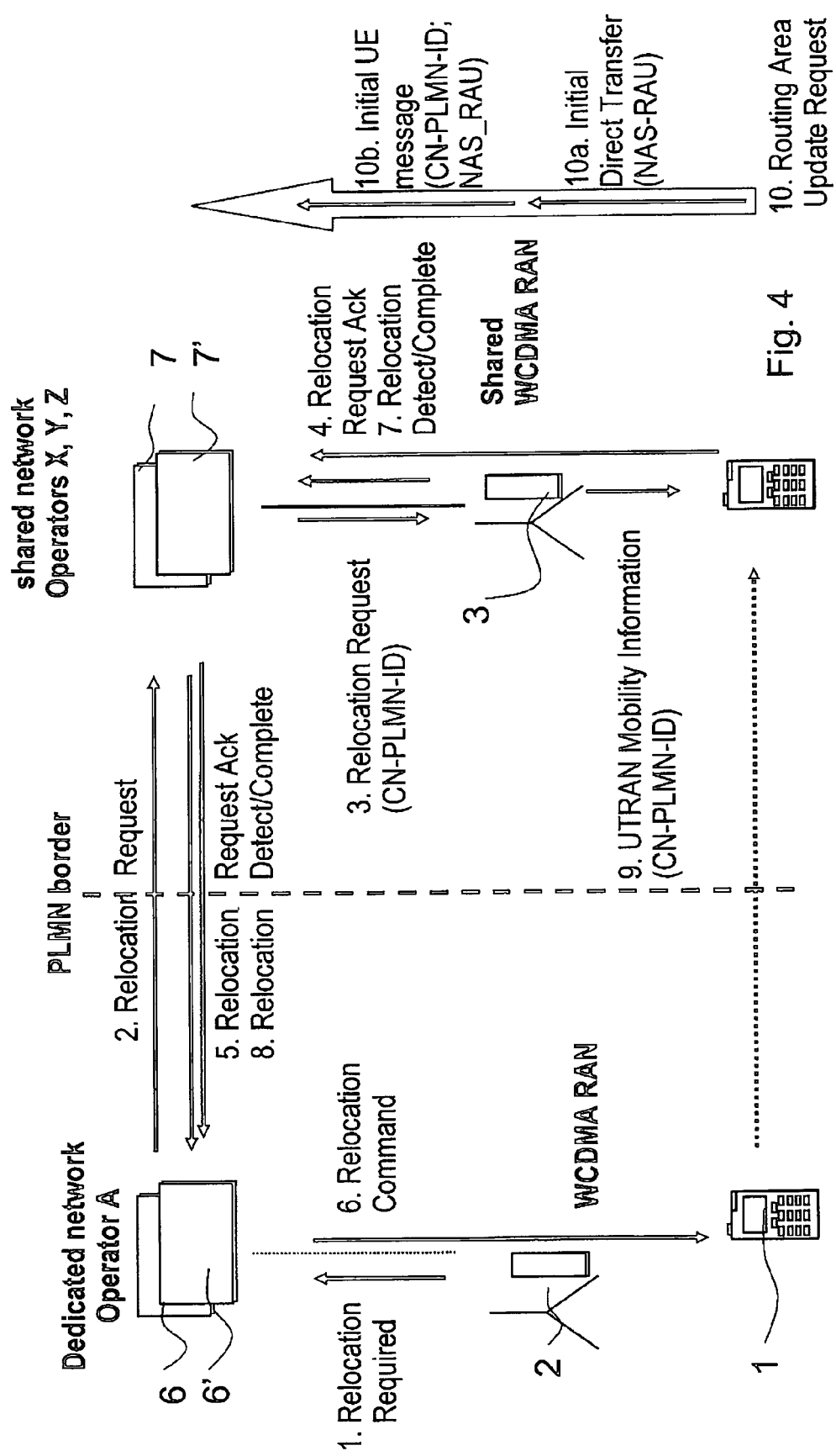
FIG. 4 shows a scenario of handover from a non-shared 3G network to a shared 3G network, and the corresponding signaling flows.

FIG. 3 illustrates a handover scenario from a 2G non-shared network to a 3G shared network, and more particularly how a circuit switched call from a dedicated GSM network is handed over to a shared UMTS network provided with GWCN configuration. It is noted that the same solution is applicable also for other handovers, for example 3G to 3G handovers as shown in FIG. 4. More particularly, FIG. 3 shows the following messages and stages:

1. A GSM base station controller (BSC) 2 decides that handover to another network should be performed and sends a 'BSSMAP Handover Required' message to an anchor MSC 6.
2. An anchor MSC 6 sends a 'BSSMAP Handover Request' message to a target MSC 7 including the identity of the user equipment (for example an International Mobile Subscriber Identity; IMSI).
3. The target (Gateway) MSC 7 selects a core network (CN) operator from available CN operators sharing the gateway core network (GWCN) and sends a 'RANAP Relocation Request' message to the RNC 3. The message includes the identity of the selected CN operator (CN-PLMN-ID).
4. After radio resources are allocated, the target RNC 3 sends a 'RANAP Relocation Request Ack' message to the target MSC 7.
5. The target MSC 7 sends 'BSSMAP Handover Request Ack' message to the anchor MSC 6.
6. The anchor MSC 6 sends a 'BSSMAP Handover Command' message to the source BSC 2. The BSC 2 then commands the user equipment 1 to perform handover to the target cell.
7. When the user equipment 1 accesses the target cell, the RNC 3 informs the selected core network about this by sending a 'RANAP Relocation Detect' message to the target MSC 7. After the handover is performed successfully the RNC 3 sends a 'RANAP Relocation Complete' message to the target MSC 7.
8. The target MSC 7 forwards the 'RANAP Relocation Detect' and 'Relocation Complete' messages to the anchor MSC 6 as 'BSSMAP Handover Detect' and 'Handover Complete' messages.
9. The new RNC 3 informs the user equipment 1 about its location by sending a 'RRC UTRAN Mobility Information' message. Among other possible information, this message may contain the identity of the selected core network operator (CN-PLMN-ID) for user equipment supporting network sharing. The RNC 3 has obtained knowledge regarding the capabilities of the user equipment 1 (supporting/non-supporting) from the AS release indication included in the 'RRC CONNECTION REQUEST' message as well as in the 'INTER RAT HANDOVER INFO' message. If the user equipment 1 is not a supporting user equipment, message 9 may include the Common-PLMN-ID instead, or any other indication of the shared radio access network which the non supporting user equipments can detect and understand.
10. The user equipment may then perform registration for packet switched services, if required, by sending a 'Routing Area Update' message, for example inside a 'RRC Initial Direct Transfer' message to the SGSN 7' transparently via the RNC 3. As the user equipment is RRC connected to the network, The 'RRC Initial Direct Transfer' message does not necessarily need to include the CN-PLMN-ID provided by the RNC 3 in step 9. The RNC 3 may use the identity received in the 'RELOCATION REQUEST' message to put it into a 'RANAP Initial UE Message'. The 'RANAP Initial UE Message' contains also the 'Routing Area Update' message from the user equipment 1. The CN-PLMN-ID indicates to the SGSN 7' which core network operator of the possible operators should be serving the user equipment 1.

Different behavior of the user equipment in different scenarios can be avoided by the above described mechanism wherein the user equipment, rather than the RNC, indicates the operator identity when the RNC.

FIG. 4 illustrates another example wherein handover occurs for a circuit switched call from a dedicated UMTS network to a shared UMTS network with a GWCN configuration and a user equipment that supports network sharing. More particularly, FIG. 4 shows the following messages and stages:

1. A source radio network controller (RNC) 2 decides that a handover to another network should be performed. A 'RANAP Relocation Required' message is sent to an anchor mobile switching center (MSC) 6.
2. The anchor MSC 6 sends a 'RANAP Relocation Request' message to a target MSC 7 including the identity of the user.
3. The target (Gateway) MSC 7 selects a core network (CN) operator from CN operators sharing the GWCN and sends a 'RANAP Relocation Request' message to the new RNC 3. The message includes the identity of the selected CN operator.
4. After radio resources are allocated, the new RNC 3 sends a 'RANAP Relocation Request Ack' message to the target MSC 7.
5. The target MSC 7 sends a 'RANAP Relocation Request Ack' message to the anchor MSC 6.
6. The anchor MSC 6 sends a 'RANAP Relocation Command' message to the source RNC 2. The RNC 2 then commands the user equipment 1 to perform handover to the target cell. If the user equipment 1 already uses the radio resources of the target RNC 2 by communicating with the serving RNC 3 via Iur interface, then it is not necessary to send any handover command messages to the user equipment 1.
7. When the user equipment 1 accesses the target cell, the RNC 3 informs the core network (CN) about this by sending a 'RANAP Relocation Detect' message to the target MSC 7. After the handover is performed successfully the RNC 3 sends a 'RANAP Relocation Complete' message to the target MSC 7. If the user equipment 1 already uses the radio resources of the target RNC 3 by communicating with the RNC 3 via an Iur interface, then the 'Relocation Detect' message is sent at the time when the target RNC 3 starts acting as a serving RNC.
8. The target MSC 7 forwards the 'RANAP Relocation Detect' and 'Relocation Complete' messages to the anchor MSC 6.
9. The RNC 3 informs the user equipment 1 about its location by sending a 'RRC UTRAN Mobility Information' message. This message may contain the identity of the selected CN operator (CN-PLMN-ID) if the user equipment supports network sharing.
10. The user equipment may then perform registration for packet switched services, if required, by sending a 'Routing Area Update' message, for example inside a 'RRC Initial Direct Transfer' message to the SGSN 7' transparently via the RNC 3. As the user equipment is RRC connected to the network, the 'RRC Initial Direct Transfer' message may not need to include the CN-PLMN-ID provided by the RNC 3 in step 9. RNC may use the identity received in the RELOCATION REQUEST to put it into a 'RANAP Initial UE Message'. The 'RANAP Initial UE Message' contains also the 'Routing Area Update' message from the user equipment 1. The CN-PLMN-ID indicates to the SGSN 7' which core network operator of the possible operators should be serving the user equipment 1

Figure 5:
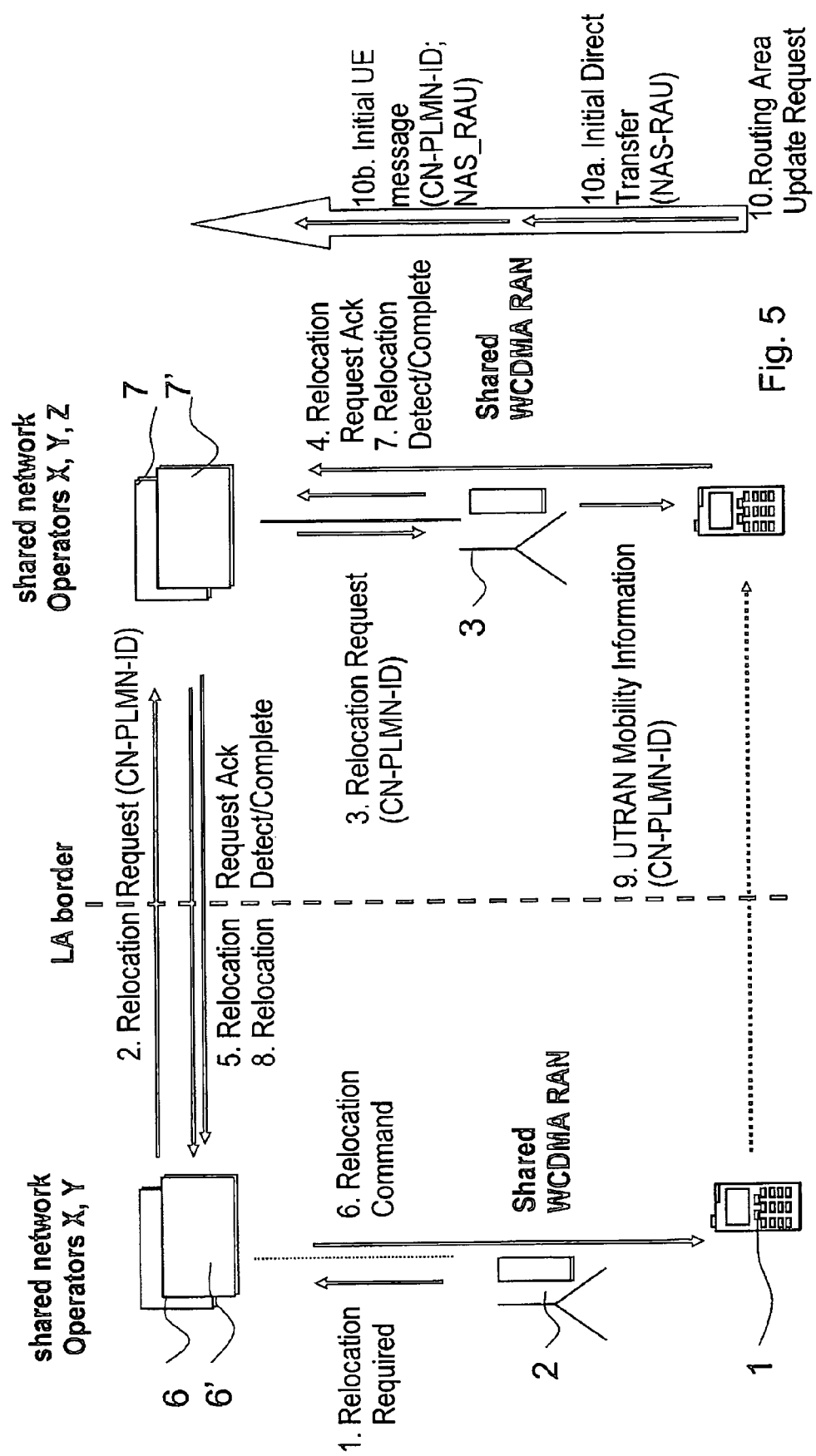
FIG. 5 shows a scenario of handover from a shared 3G network to another shared 3G network, and the corresponding signaling flows.

FIG. 5 illustrates yet another example wherein handover occurs from a shared 3G network to another shared 3G network over a LA border.

The MSC 7 acting as a relay MSC, or the target MSC during handover, may be provided with an appropriate data processor for implementing an appropriate algorithm to select an appropriate operator. The selection may be based on a variety of possible algorithms and parameters. For example, the identity of the user (for example International Mobile Subscriber Identity; IMSI) may be used as one selection criteria. Some exemplifying scenarios are given below:

Operator A and Operator B share a network. If a handover to the shared network is performed for B's or its affiliates' subscriber, then it may be preferred if B becomes the serving operator for the user in the shared network. Selection may also be based on statistical and/or historical data. Sharing operators may have agreed that for example A gets 60% and B 40% of the international roamers in the shared network. In this case the core network controller would have to implement an algorithm to assign subscribers accordingly to these operators and the selected operator identity would be indicated to the user equipment accordingly. A possible selection criteria may be the network identity from which the handover is performed. For example, if a handover is performed from A's dedicated network to a shared network in which A is one of the sharing partners, then it might be preferred that A is selected as the serving operator in this particular scenario.

The operator is preferably selected after initiation of the transfer. The selection may be performed by the target MSC (relay) after it has received a request for handover or relocation and before the target MSC sends a request for transfer to the target RNC. The selection may at least partially be based on information preconfigured in the target MSC. This preconfigured information may be for example, but not limited to, such that users with home PLMN identities 'X, Y, Z' will be assigned operator 'A' in a shared network, users with home PLMN identity 'I, J, K, L' will be assigned operator 'B' in a shared network, and users with home PLMN identity 'P, Q, R' will be assigned operator 'C' in a shared network. Users with any other home PLMN identity may then be assigned operator 'A', 'B', or 'C' in a shared network based on, for example, even statistical distribution.

Selection by the target core network controller is a preferred option since there may not be agreements between all individual operators involved. The individual operators of the shared network may not have roaming agreements with the operator of the non-shared network. The "old" core network controller is not a part of the shared networks, and it may therefore be preferred if its operation is not affected at all by any aspects of the shared network.

In the above described example the MSC 7 indicates the identity of the selected core network operator in a 'RANAP Relocation Request' message sent to RNC. This function as such is mandatory for some MSCs, for example those complying with shared GWCN in accordance with release 6 (rel-6) of the 3GPP.

The access network controller in the shared network is also provided with an appropriate algorithm to detect whether a user equipment is a supporting one or not. This may be provided, for example, by means of an appropriate software configured to detect the enablement information from messages such as the Access Stratum (AS) release indication included in a 'RRC CONNECTION REQUEST' message and/or in the 'INTER RAT HANDOVER INFO' message and/or 'RRC CONNECTION SETUP COMPLETE'.

If the user equipment is determined by the software or another logic as being a supporting user equipment, the software may include the identity of the selected core network operator in a message such as the 'RRC UTRAN Mobility Information' message.

It is noted that in the case of an inter-MSC handover within a shared network, the anchor shared MSC may need to send the CN-PLMN-ID over an E-MAP interface.

The above used the CN-PLMN-ID as an example of a possible identity. There are also other alternatives, for example the Global CN-ID IE used for the Iu-flex/NNSF function of 3GPP Release 5 and later releases when a 'RELOCATION REQUEST' message is sent from a core network node towards an access network controller for which the sending core network node is not the default core network node.

In the above examples the transfer from an access system to another occurs before a selected identity is sent to the user equipment UE. This is not necessary in all applications. In this alternative the target access network controller may include the selected operator identity for example into a 'RRC Handover Command' message sent to the user equipment transparently via the target core network controller, the source network controller and the source radio access network controller.

The above data processing functions may be provided by means of one or more data processor entities. Appropriately adapted computer program code product may be used for implementing the embodiments, when loaded to a computer, for example for performing the computations and the searching, matching and combining operations. The program code product for providing the operation may be stored on and provided by means of a carrier medium such as a carrier disc, card or tape. A possibility is to download the program code product via a data network. Implementation may be provided with appropriate software in a location server. Thus it may be that no additional hardware is needed in some applications. Additional memory and processing capacity may be needed in a location server.

It should be appreciated that whilst embodiments of the present invention have been described in relation to user equipment such as mobile stations, embodiments of the present invention are applicable to any other suitable type of user equipment.

It is understood that other embodiments of the invention are possible, while remaining within the scope of the invention. Thus the invention is also applicable to other mobile techniques than the GSM and WCDMA.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
receiving, at a second network, a transfer initiation message for a user equipment from a first network, the second network providing resources to a plurality of operators;
selecting, by the second network, an operator for the user equipment from the plurality of operators;
providing a controller of the second network with information regarding identity of the selected operator;
transferring the user equipment to the second network;
determining, in the controller of the second network, whether the user equipment supports sharing of network resources;
sending, by the controller of the second network, information regarding the identity of the selected operator to the user equipment, via an air interface, subsequent to detection that the user equipment supports sharing of network resources,
sending, by the controller of the second network, a default identity to the user equipment, via the air interface, subsequent to detection that the user equipment does not support sharing of network resources, and receiving by a core network controller, from the user equipment, the identity of the selected operator via an access network controller in an 'Initial Direct Transfer' message.

2. A method as claimed in claim 1, further comprising:
sending information regarding the identity of the selected operator to a core network controller from an access network controller.

3. A method as claimed in claim 1, wherein the sending information regarding the identity of the selected operator to the user equipment comprises sending the identity information in a resource control information message.

4. A method as claimed in claim 3, wherein the sending the information regarding the identity of the selected operator in a resource control information message comprises sending the identity of the selected operator in a 'UTRAN mobility information' message.

5. A method as claimed in claim 1, wherein the providing the controller of the second network with information comprises sending identity information from a core network to a radio access network.

6. A method as claimed in claim 5, wherein the sending identity information comprises sending the identity information in a relocation request message.

7. A method as claimed in claim 1, wherein the selecting an operator for the user equipment comprises selecting an operator by a core network controller.

8. A method as claimed in claim 1, further comprising:
transferring an identity of a selected core network operator from a source/anchor controller to a target/relay controller within a shared network.

9. A method as claimed in claim 1, wherein the determining comprises detection by an access network controller that the user equipment is provided with capabilities to support network sharing.

10. A method as claimed in claim 9, wherein the detecting comprises analyzing a message associated with the transfer.

11. A method as claimed in claim 1, wherein the transferring the user equipment to the second network comprises performing an inter radio access technology handover from a second generation network to a third generation network.

12. A method as claimed in claim 1, wherein the transferring the user equipment to the second network comprises performing a transfer from a non-shared third generation network to a shared third generation network.

13. A method as claimed in 1, wherein the transferring the user equipment to the second network comprises performing a transfer from a shared third generation network to another shared third generation network.

14. An apparatus, comprising:
at least one memory including computer program code,
at least one processor,
wherein the at least one memory and the computer program code are configured to, with the at least one processor, cause the apparatus at least to
select an operator amongst a plurality of operators for a user equipment that is to be transferred from a first network to a second network,
send information regarding the identity of the selected operator to a controller to send the information regarding the identity of the selected operator to the user equipment, via an air interface, subsequent to detection that the user equipment supports sharing of network resources and send a default identity to the user equipment, via the air interface, subsequent to detection that the user equipment does not support sharing of network resources, and receive the identity of the selected operator from the user equipment via an access network controller in an 'Initial Direct Transfer' message.

15. The apparatus of claim 14, further comprising:
at least one of a mobile switching center and a serving general packet radio service support node.

16. An apparatus, comprising:
at least one memory including computer program code,
at least one processor,
wherein the at least one memory and the computer program code are configured to, with the at least one processor, cause the apparatus at least to
receive, during transfer of a user equipment from a first network to a second network, information regarding the identity of a operator to be used by the user equipment from a second controller;
determine whether a user equipment is provided with shared network capability,
control identity information to be transmitted to a user equipment, wherein the received information regarding the identity of an operator is to be transmitted to the user equipment, via an air interface, subsequent to detection that the user equipment is provided with shared network capability, and a default identity is to be transmitted to the user equipment, via the air interface, subsequent to detection that the user equipment is not provided with shared network capability, and
pass, from the user equipment, the identity of the selected operator in an 'Initial Direct Transfer' message to a core network controller.

17. The apparatus of claim 16, further comprising:
a radio network controller of a third generation communication system.

18. A system, comprising:
a plurality of communication networks, at least one of the communication networks providing resources to a plurality of operators; and
a first controller configured to select an operator for the user equipment amongst a plurality of operators during a transfer between the plurality of networks and to send to a second controller information regarding the identity of the selected operator, wherein the second controller is configured to determine whether a user equipment supports sharing of network resources, subsequent to determination that the user equipment supports resource sharing, to send the information regarding the identity of the selected operator to the user equipment, via an air interface, and subsequent to determination that the user equipment does not support resource sharing, to send a default identity to the user equipment, via the air interface,
wherein the user equipment is configured to send the identity of the selected operator to the first contoller via the second controller in an 'Initial Direct Transfer' message.

19. A system as claimed in claim 18, wherein the controller comprises a core network controller and the second controller comprises an access network controller.

20. A method, comprising:
selecting, by a device, an operator amongst a plurality of operators for a user equipment that is to be transferred from a first network to a second network,
sending, by the device, information regarding the identity of the selected operator to a controller to send the information regarding the identity of the selected operator to the user equipment, via an air interface, subsequent to detection that the user equipment supports sharing of network resources and send a default identity to the user equipment, via the air interface, subsequent to detection that the user equipment does not support sharing of network resources, and receiving, by the device, the identity of the selected operator from the user equipment via an access network controller in an 'Initial Direct Transfer' message.

21. The method of claim 20, wherein the device comprises at least one of a mobile switching center and a serving general packet radio service support node.

22. A method, comprising:
receiving, by a device, during transfer of a user equipment from a first network to a second network, information regarding the identity of a operator to be used by the user equipment from a second controller;
determining, by the device, whether a user equipment is provided with shared network capability; and
controlling, by the device, identity information to be transmitted to a user equipment, wherein the received information regarding the identity of an operator is to be transmitted to the user equipment, via an air interface, subsequent to detection that the user equipment is provided with shared network capability, and a default identity is to be transmitted to the user equipment, via the air interface, subsequent to detection that the user equipment is not provided with shared network capability, passing, by the device, the identity of the selected operator in an 'Initial Direct Transfer' message from the user equipment to a core network controller.

23. The method of claim 22, wherein the device comprises a radio network controller of a third generation communication system.

* * * * *